United States Patent

[11] 3,579,892

| [72] | Inventor | James O. Olvey, Sr. P.O. Box 287, La Follette, Tenn. 37766 |
|---|---|---|
| [21] | Appl. No. | 848,493 |
| [22] | Filed | Aug. 8, 1969 |
| [45] | Patented | May 25, 1971 |

[54] BEAD-HEAD FLY WITH DANGLING SPINNER
9 Claims, 4 Drawing Figs.

[52] U.S. Cl.................................... 43/42.11,
43/42.28, 43/42.37
[51] Int. Cl..................................... A01k 85/00
[50] Field of Search........................... 43/42.11,
42.13, 42.28, 42.37

[56] References Cited
UNITED STATES PATENTS

| 2,107,436 | 2/1938 | Flanagan...................... | 43/42.13 |
| 2,315,304 | 3/1943 | Upperman.................... | 43/42.28 |
| 2,739,406 | 3/1956 | Nunnally...................... | 43/43.13X |
| 2,778,144 | 1/1957 | Jones et al. .................. | 43/42.11 |
| 2,994,151 | 8/1961 | Webb............................ | 43/42.28 |
| 3,253,363 | 5/1966 | Steehn.......................... | 43/42.13 |

Primary Examiner—Samuel Koren
Assistant Examiner—Daniel J. Leach
Attorneys—Clarence A. O'Brien and Harvey B. Jacobson ABSTRACT: A bead-head fly lure for jigging, casting or trolling for game fish, comprising a molded bead head of the weight desired. The forward right-angled end of the shank of the hook is embedded in the upper half-portion of the head in a manner to expose the line eye. The hook end of the shank projects beyond a flared neck on the rearward side of the head to accommodate either live or artificial bait, usually a bucktail. A swivel on the bottom of the head is equipped with a snap fastener for a dangling spinner.

PATENTED MAY 25 1971  3,579,892

James O. Olvey, Sr.
INVENTOR.

BY Clarence A. O'Brien
and Harvey B. Jacobson
Attorneys

BEAD-HEAD FLY WITH DANGLING SPINNER

This invention relates to a fishing lure which is expressly designed and adapted for jigging, casting or trolling for fish such as large and small mouth bass, walleye and various species of game fish and pertains, more explicitly stated, to a bead-head fly characterized by a spherical head of prescribed weight and which is equipped with self-contained features which well serve the purposes for which they have been devised and effectually used.

To the ends desired, the bead-type head can be of the degree of heaviness desired whereby to be acceptably and reliably serviceable with such tackle as needed (casting, spinning, or spin casting). An integral neck on the rear side of the head is of requisite length and cross section and has a flared or flanged end to support either live or artificial bait. The L-shaped forward end of the hook's shank is appropriately embedded to position the line eye atop the crown of the head.

Briefly, the herein disclosed lure comprises an appropriately weighted bead-head which is provided on a rearward side with an integral outstanding neck whose rear end portion is gradually increased in cross section to provide an outwardly flaring flange. This neck facilitates the mounting of a bucktail which can be made of animal hair dyed to provide the color (or colors) desired. The hairs which are gathered and bunched around the neck, can be tied in place with properly wrapped and bonded nylon threads. The flared formation of the shank serves to keep the hair skirt or bucktail from slipping off the shank and assists in spreading the hairs in a manner to conceal the rearwardly projecting part of the overall fishhook. A swivel is secured to and depends below the bottom of the head and serves to attach a snap fastener which, in turn, suspends a dangling spinner. Spinners of various colors and which afford the attraction desired are selectively attachable to the snap fastener and are changeable at will.

Experience has shown that the depending swivel tends to make the lure substantially weedless in that it frequently causes the lure to bounce upward when colliding with a submerged object such as a rock or log. Then, too, the conjoint action of the coacting spinner also assists in the upward riding over submerged obstructions. Further, the center of gravity of this unique lure is such that the barbed point of the hook usually rides horizontally with the point directed upwardly. In addition, the swivel permits the spinner to maneuver under the hair skirt in a manner to agitate the fluttering hairs and to thus simulate the actions of a live insect.

It is within the purview of the inventive concept to manufacture and sell the lure with or without the aforementioned hair skirt and, with the skirt off and the hook bare, a live or an artificial bait (night crawler or other live bait) can be attached for good results.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4:
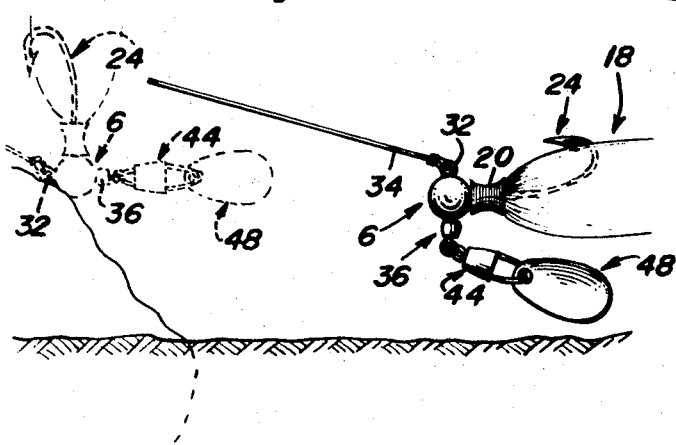

And FIG. 4 is a view showing the fly in use and illustrating, in phantom lines, how the cooperating parts tend to function when an obstruction is struck and the line is being retrieved in a direction from right to left.

Figure 1:
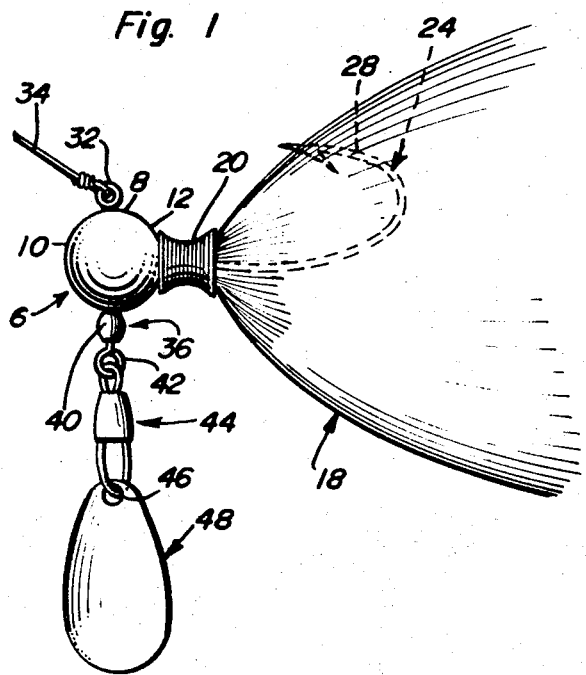
FIG. 1 is a view in side elevation of a bead-head fly with a dangling spinner constructed in accordance with the principles of the present invention and readied for use.
Figure 2:
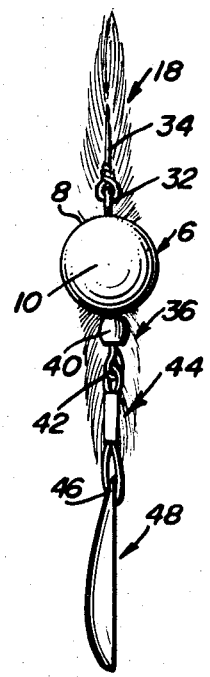
FIG. 2 is a front end view, that is a view observing FIG. 1 in a direction from left to right.
Figure 3:
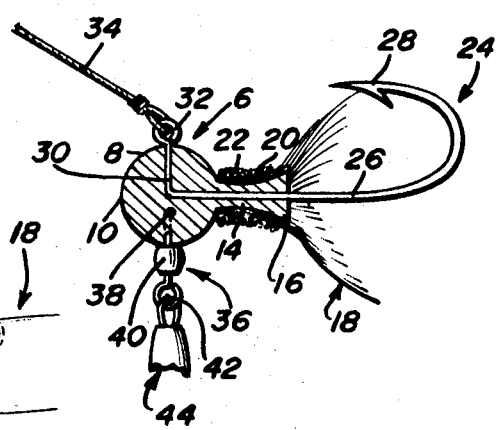
FIG. 3 is a view in section and elevation showing the spinner omitted.

Referring now to the views of the drawing and more particularly to FIGS. 1 to 3 inclusive, it will be seen that the aforementioned weighted bead-head is denoted by the numeral 6. It is of spherical or customary ball-like design and is made of requisite size and weight. The crown or top side is denoted by the numeral 8, the forward or leading surface 10 and rearward surface at 12. The aforementioned integral neck 14 is joined at its forward end to the surface 12 and it projects a suitable distance where it increases gradually in cross section and terminates in a slightly enlarged flange 16. This flange is also referred to as a flaring terminal end portion. As before stated, it is within the purview of the invention to use the overall fly or lure without a hair skirt or bucktail. However, and in the views of the drawing, the bucktail is shown and the forward ends of the hairs are arranged orderly around the neck and are bound in place by a tight-wrapped nylon thread 20. In practice, this thread can be bonded in place to facilitate securing the hairends 22 and to prevent accidental displacement of the bucktail. The flaring construction also serves to spread the hairs into the position and relationship illustrated in the views of the drawing.

The fishhook is denoted by the numeral 24 and has a generally straight shank, the median and rear portion 26 of which projects beyond the flaring neck and is provided with a return-bend providing a barbed hook 28. The forward shank portion extends through the neck and through the rear part of the upper half of the head and is provided with a laterally directed bend or bent portion 30 which projects upwardly through the head and terminates in an eye 32 to which the fishing line 34 is connected.

The swivel means is denoted by the numeral 36 and the usual upper eye member 38 thereof is embedded in the lower half portion of the head 6 in the manner brought out in FIG. 3. The barrel 40 depends below the underneath side of the head and is diametrically opposite the line attaching eye 32 and positions the lower eye member 42 in a position for the attachment thereto of a coacting end portion of the openable and closable snap fastener 44. This snap fastener is of a conventional type. The snap fastener serves to accommodate the upper apertured end 46 of the aforementioned spinner 48.

FIGS. 1, 2 and 3 show the component parts and how they are individually constructed and coordinated to provide the overall ready-to-use so-called bead-head fly. FIG. 4 shows in full and phantom lines how the component parts can cooperate when colliding with a rock, log or other obstruction in the path of movement of the lure. It will be evident therefore that the invention is such in construction and capability that it well serves the purposes for which it has been constructed and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. For use when jigging, casting or trolling for game fish, a fishing lure comprising a weighted bead-type head provided on a rearward side with an integral outstanding neck, a fishhook embodying a shank having an upwardly forwardly directed barbed hook at a rearward end and an upstanding right-angled portion at its forward end, a forward end portion of said shank being axially embedded in and extending through said neck and said upstanding portion projecting through the crown surface of said head and terminating in a line attaching eye, the median and rearward end portion of said shank projecting beyond the rearward end of said neck, a swivel having an upper end embedded in the bottom portion of said head diametrically opposite said line attaching eye.

2. The lure defined in and according to claim 1, and a snap fastener operatively connected to and cooperable with a coacting part of said swivel.

3. The lure defined in and according to claim 1, and a snap fastener operatively connected to and cooperable with a coacting part of said swivel, and a dangling-type spinner detachably operatively connected with said snap fastener.

4. The lure defined in and according to claim 1, and wherein the rearward end portion of said neck is increased in cross-sectional dimension and terminally flared to facilitate attachment of a bucktail or the like to said flared neck.

5. The lure defined in and according to claim 4, and wherein said swivel embodies an upper eye which is embedded in said head, a lower eye and a complemental barrel assembling and operatively joining said eyes to each other, a snap fastener operatively connected to said lower eye, and a dangling-type spinner detachably operatively connected with said snap fastener.

6. The lure defined in and according to claim 4 and, in combination, a bucktail concealing the barbed hook and embodying bunched hairs having forward end portions cooperatively oriented with said neck, and nylon cord wrapped around said end portions and bonded thereto and to said neck in a manner to unite the bucktail with said head.

7. For use when jigging, casting or trolling for game fish, a fishing lure comprising a weighted bead-type head provided on a rearward side with an integral outstanding neck, a fish hook embodying a shank having an upwardly forwardly directed barbed hook at a rearward end and an upstanding right-angled portion at its forward end, a forward end portion of said shank being axially embedded in and extending through said neck and said upstanding portion projecting through the crown surface of said head and terminating in a line attaching eye, the median and rearward end portion of said shank projecting beyond the rearward end of said neck, a swivel embodying a barrel provided with upper and lower eyes, said upper eye embedded in the centralized bottom of said head diametrically opposite the position of the line attaching eye, a spinner, and snap fastener means linking an end of said spinner to the lower swivel eye.

8. The lure defined in and according to claim 7, and wherein said neck has a free rearward end which is gradually increased in cross-sectional dimension and terminates in an outstanding and flaring flange, a portion of the shank of said hook and the barbed hook itself being spaced from the neck to accommodate and permit the use of a live or an artificial bait, as may be desired by the angler.

9. The lure defined in and according to claim 8 and, in combination, a bucktail concealing the barbed hook and embodying bunched hairs having forward end portions cooperatively oriented with said neck, and nylon cord wrapped around said end portions and bonded thereto and to said neck in a manner to unite the bucktail with said head.